Sept. 25, 1962
W. A. NEAL
3,055,121
NUMERAL BASE CONVERSION DEVICE
Filed Feb. 16, 1961
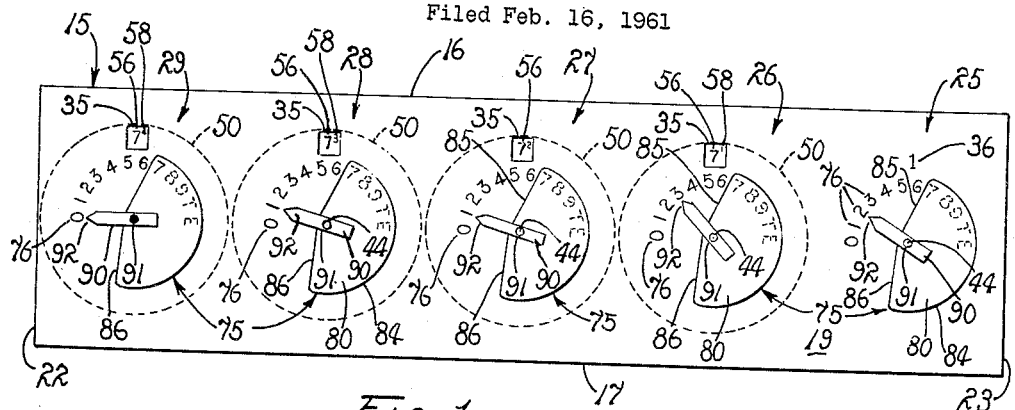
*FIG. 1.*
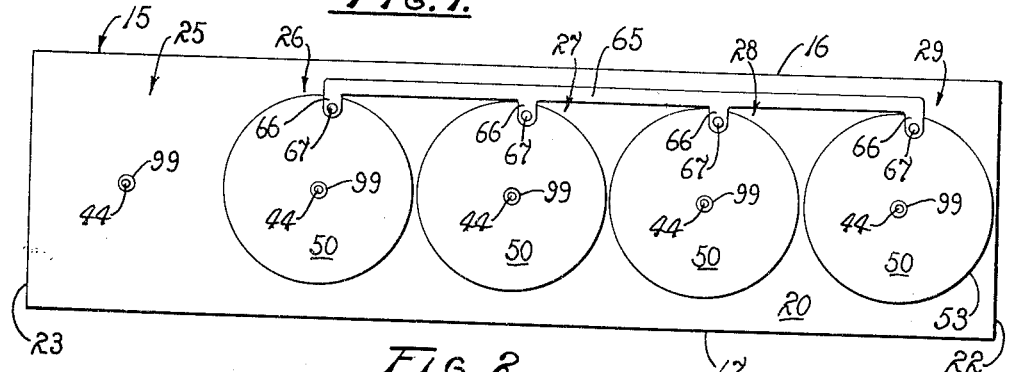
*FIG. 2.*
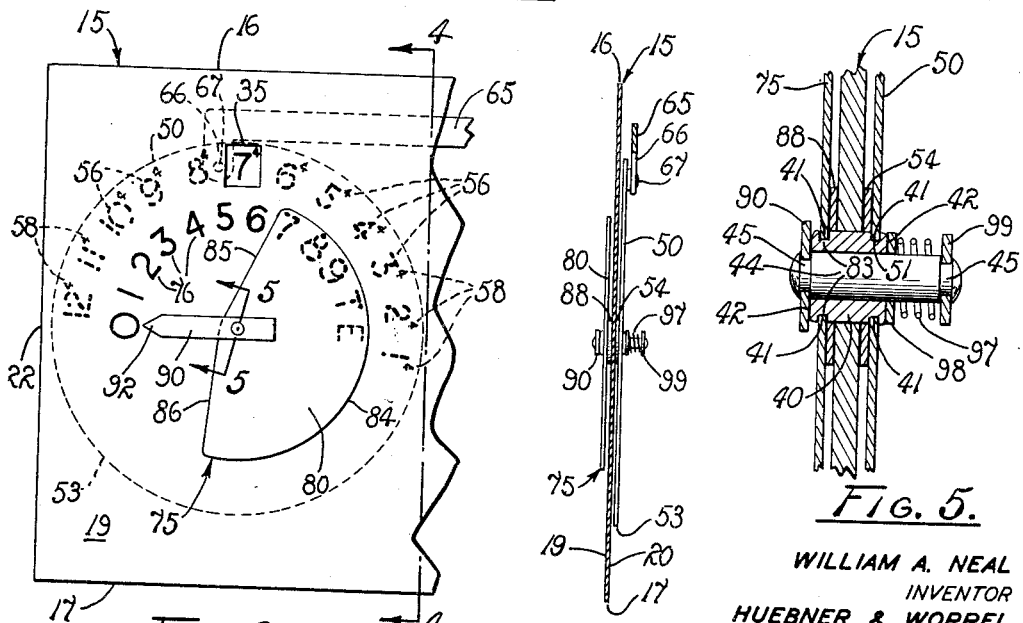
*FIG. 3.*   *FIG. 4.*   *FIG. 5.*
WILLIAM A. NEAL
INVENTOR
HUEBNER & WORREL
ATTORNEYS
BY *Richard M. Worrel*

NUMERAL BASE CONVERSION DEVICE

William A. Neal, 1150 E. Hampton Way, Fresno, Calif.
Filed Feb. 16, 1961, Ser. No. 89,885
10 Claims. (Cl. 35—31)

The present invention relates to a numeral base conversion device and more particularly to such a device for converting a numeral in one base system to its corresponding numeral in a different base system.

It is well-known that there are various mathematical base systems or systems of numeration. For example, the decimal system in wide usage, of course, employs the base "ten." That is, every numeral is expressed as a sum of terms each of which is the product of a number less than the base multiplied by a power of the base.

However, it is generally recognized that the mathematical system having the base "ten" is not desirable under all circumstances. Thus, in certain modern electronic computers, it is essential to use a binary system. That is, a system having the base "two." Computers generally use the base "two." Accordingly, it is of increasingly greater importance in courses on mathematics to teach numeral systems having different base numbers as well as how to convert from a system having one base number to a system having a different base number.

The steps or mathematical rules for converting from one base system to another are known. However, it has frequently been difficult to explain these steps to students by conventional teaching methods. It has been even more difficult for certain students and others to remember the conversion rules. Even when the rules are known and can be applied, most of the calculations in making the conversions must be written out thereby increasing the time and effort involved.

Accordingly, it is an object of the present invention to provide a numeral base conversion device for converting a numeral in one base system to its corresponding numeral in a different base system.

Another object is to provide such a device having advantageous use in the teaching of the conversion of numerals in a given base system to those of a different base system.

Another object is to minimize the time and effort involved in converting a numeral in one base system to an equivalent numeral in a different base system.

Another object is to provide a device of this nature which is easy to use, dependable in result, compact in size, and adaptable for converting between a wide range of numerical systems and base numbers.

These, together with other objects, will become more fully apparent upon reference to the following description and accompanying drawing.

In the drawing:

FIG. 1 is a front elevation of a numeral base conversion device embodying the principles of the present invention.

FIG. 2 is a rear elevation of the subject conversion device.

FIG. 3 is a fragmentary, somewhat enlarged front elevation of the device.

FIG. 4 is a transverse section taken on line 4—4 in FIG. 3.

FIG. 5 is a somewhat enlarged, fragmentary transverse section taken on line 5—5 of FIG. 3.

Preliminary to a detailed description of the structure of the subject device, it is believed helpful to provide antecedent basis for certain terminology used in such description. Thus, reference is made hereinafter to conversion of a first numeral having a first base system (for example $(415)_{10}$) to a second numeral having a second base system wherein each numeral is composed of several digits with the digits of each numeral being in the usual digit positions, that is, from right to left, a "unit" position, a "ten" position, a "hundred" position, etc.

Referring now more particularly to the accompanying drawing, a substantially rectangular, preferably rigid, panel is indicated by the numeral 15. The panel has upper and lower edges 16 and 17 and front and rear surfaces 19 and 20. The panel also has opposite side edges 22 and 23 which are respectively referred to as the left side edge and the right side edge, as viewed in FIG. 1, for descriptive convenience.

The subject numeral base conversion device includes a "unit" indicator 25, a "ten" indicator 26, "hundred" indicator 27, a "thousand" indicator 28, a "ten thousand" indicator 29. The panel 15 mounts the indicators in successively adjacent, predetermined positions corresponding to the positions of the digits in a second numeral to a second base system to be determined from a first known numeral and known base system. As will be subsequently explained in greater detail, each indicator is adapted to indicate a digit in the unknown second numeral. More specifically, the indicators are located longitudinally of the panel with the "unit" indicator relatively adjacent to the right edge 23, with the "ten thousand" indicator relatively adjacent to the left edge, and with the "ten," "hundred" and "thousand" indicators substantially equally spaced between the "unit" indicator and the "ten thousand" indicator.

The panel provides a plurality of substantially rectangular windows 35 positioned in a row extended longitudinally of the panel relatively adjacent to the upper edge 16 thereof. The windows are individually associated with the "ten,'" "hundred,'" "thousand," and "ten thousand" indicators 26, 27, 28, and 29, respectively. However, no window is provided for the "unit' indicator 25. Instead, and as explained more fully hereinafter, a number "1," indicated at 36, is marked on the front surface 19 of the panel and is associated with the "unit" indicator.

Each of the indicators 25, 26, 27, 28, and 29 provides a tubular bushing 40 mounted in the panel 15 substantially equidistantly spaced below the windows 35 and the number "1" at 36, of their respective indicators. The bushings are in substantially uniformly axially spaced relation longitudinally of the panel and extend forwardly and rearwardy from the front and rear surfaces 19 and 20 of the panel, as best illustrated in FIG. 5. Further, each bushing has annular, front and rear grooves 41 and front and rear ends 42 respectively adjacent to the front and rear surfaces of the panel. Relatively short journal pins 44 are rotatably received in the bushings and have opposite ends extended outwardly from the front and rear surfaces of the panel. The pins provide annular, front and rear recesses 45 in their opposite ends, these recesses being respectively spaced from the front and rear ends of the bushings in which they are received.

With particular reference to FIGS. 2 and 3, substantially circular, rear dials or disks 50 provide inner circular edges 51 respectively fitted in the rear grooves 41 of the bushings 40 associated with the "ten," "hundred," "thousand" and "ten thousand" indicators 26, 27, 28 and 29. The "unit" indicator 25 does not employ a rear dial. The inner edges of the dials circumscribe their respective bushings and are rigidly secured to such bushings for unitary movement of the dials and their corresponding bushings. The dials also have substantially circular outer edges 53 concentric to their respective bushings and radially outwardly spaced therefrom by distances slightly greater than the spacing between the windows 35 and the bushings individually therebelow. Washers 54 circumscribe the bushings and are positioned between the rear surface 20 of the panel 15 and the dials. Each dial has a substantially semi-circular row 56 of base numbers from one to twelve in the illustrated embodiment. It is to be noted that this row of numbers extends along an arc adjacent to the outer edge of its associated dial. This arc is concentric to its respective bushing 40 and is radially spaced therefrom substantially the same distance as the radial spacing of the windows from their associated bushings. It is also to be noted that the base numbers increase successively from one to twelve in a counterclockwise direction, as viewed in FIG. 3. Additionally, powers, denoted by the reference number 58, are exponentially applied to the base numbers in each row with all of the powers being the same on each rear dial. However, the powers on successive dials are unitarily progressively increased from the "ten" indicator 26 to the "ten thousand" indicator 29. In the illustrated embodiment, the power to which the base numbers of the "ten" indicator are raised is 1 while the powers of the "hundred," "thousand," and "ten thousand" indicators are respectively 2, 3 and 4. While the row 56 of base numbers is illustrated and described above as extending through a semi-circle, it is to be understood that this row can extend throughout a full circle, or any other desired segment of a circle, on the dial.

It is believed worthy of note that the marking of the numeral 1 at 36 on the panel 15 is equivalent to the incorporation of a rear dial, not shown, in the "unit" indicator 25 in a manner similar to the other indicators, 26, 27, 28, and 29, as described above. If such a rear dial were provided in the "unit" indicator, it would include a row of base numbers, not shown, each raised to the zero power. Since any number raised to the zero power is 1, it is a simplification merely to apply the numeral 1 at 36 and dispense with such a rear dial.

An elongated, substantially straight, rigid linkage 65 includes a plurality of laterally extended, coupling portions 66 spaced longitudinally of the linkage substantially the same distance as the spacing between the adjacent journal pins 44. The coupling portions of the linkage are individually connected to the rear dials 50 adjacent to their outer edges 53 by pivot pins 67. The linkage interconnects the dials for unitary rotary movement with their respective bushings whereby the base numbers 56 and their associated powers 58 are successively exposed through the windows 35 in the panel 15. Insofar as FIG. 1 of the drawing is concerned, it is to be understood that powers 58 are only shown adjacent to the base numbers exposed through the windows. For purposes of clarity, these exponential powers have not been applied to those base numbers which are not exposed through the windows even though such base numbers are shown in dashed lines. In FIG. 5, however, both the base and power numbers are shown in dashed lines. The dials are interconnected by the linkage so that the same base number is simultaneously exposed through all of the windows in any selected position of the dials. Thus, it is noted in FIG. 1, that the base number seven is illustratively visible through all of the windows.

Each indicator 25, 26, 27, 28, and 29 also includes a front dial, generally indicated by the numeral 75. Since each of the front dials is the same, only one is described in detail, it being noted that like reference numerals are applied to corresponding parts of the several front dials. Each front dial has a substantially semi-circular row 76 of digits from zero to eleven in the illustrated embodiment. It is to be noted that whereas numbers are provided for the digits from zero through nine, the letters "T" and "E" are used to represent the digits ten and eleven for purposes of clarity in the limited space provided. The row of digits is arcuate and substantially concentric to the journal pin 44 of its respective front dial. Further, the radius of each row of digits is less than the radial distance between its window 35 and respective bushing 40, and less than the radial distance between the number "1" at 36 and its respective bushing. Preferably, the row of digits extends arcuately above its respective bushing radially inwardly of its respective row 56 of base numbers. Also, it is to be noted that the digits increase in a clockwise direction, as viewed in FIGS. 1 and 3, from zero to eleven.

Fractionally circular cover plates 80 have inner circular edges 83 individually circumscribing the bushings 40 in the front grooves 41. The plates are secured to their bushing for unitary movement therewith. Each plate has an outer arcuate edge 84 concentric to its respective bushing and radially spaced therefrom by an amount slightly greater than the radial distance of the row of digits 76 from their respective bushings 40. Still further, each plate provides obtusely angularly related first and second limit defining, generally radially extended edges 85 and 86. A washer 88 circumscribes each bushing and is positioned between the front surface 19 of the panel 15 and the adjacent plate 80.

An elongated pointer 90 has a mounting portion 91 rotatably connected to the front end of each journal pin 44 and fitted in its respective front recess 45. The pointer is radially outwardly extended from the pin 44 and provides an outer tip 92 radially spaced from the journal pin a distance slightly less than the radial spacing of the row 76 of digits from such journal pin. It is also to be noted that each pointer bears against the front end 42 of its respective bushing and is rotatable relative thereto.

A coiled compression spring 97 encircles each journal pin 44 rearwardly of the rear end 42 of the associated bushing 40. Spaced collars 98 and 99 also circumscribe the journal pin. One of these collars is against the rear end of the bushing and the other is fitted in the rear recess 45 of the pin. The springs have opposite ends bearing against the collars thereby yieldably urging the pointers 90 into frictional engagement with the front ends 42 of their respective bushings 40.

With reference to FIG. 3, it is to be noted that each bushing 40 interconnects its associated rear dial 50 and plate 80 in a predetermined angular relationship. That is, if a dial is rotated by the linkage 65 so that a base number 56 and associated power 58 are exposed through its respective window 35, the plate is moved through its connection to the dial by the bushing so as to cover the digit in the row 76 corresponding to the exposed base number and all of the digits thereabove. Stated otherwise, the plate is moved so as to expose only those digits in the row of digits which are smaller in value than the base number exposed in the window.

*Operation*

The operation of the described embodiment of the subject invention is briefly summarized at this point. Assuming that it is desired to convert the numeral 415 of the base 10, that is $(415)_{10}$, to a second numeral to the base 7, or $(x)_7$, and referring to FIGS. 1 and 5, the linkage 65 is manipulated to rotate the rear dials 50 and cover plates 80 until the base 7 in the rows 56 appears through the windows 35. Thus, "71" appears in the window of the "ten" indicator 26, "72" in the window of the "hundred" indicator 27, "73" in the window of the "thousand" indicator 28, and "74" in the window of the "ten thousand" indicator 29. Further, the plates are automatically positioned so as to expose the digits zero to six in the rows 76 of digits and to cover the digits seven to eleven in said rows.

Starting with the "ten thousand" digital indicator 29, the first digit of $(x)_7$ is determined as follows. It is known that $7^4$ equals 2401. Since this is more than 415, no $7's^4$ can be employed in adding up to 415. Accordingly, the "ten thousand" pointer 90 is set at the digit "0" in the row 76.

Proceeding to the "thousand" indicator 28, each digit in the row 76 thereof has a value of itself times $7^3$. Since $7^3$ is 343, one number of such magnitude can be used in adding up to 415. Accordingly, the "thousand" pointer 90 is set at "1."

Continuing, 343 is subtracted from 415 to determine the remainder required in order to reach 415. This difference is 72. Employing the "hundred" indicator 27, each digit in the row 76 thereof has a value of itself times $7^2$. Inasmuch as $7^2$ is 49, one $7^2$ can be employed in arriving at 415. Accordingly, the "hundred" pointer 90 is set at "1."

Subtracting 49 from 72 gives a difference of 23. On the "ten" indicator 26, each digit in the row 76 thereof has a value of itself times $7^1$. Thus, the "ten" pointer 90 is set at "3" so as to use three of the 7's in the numeral $(x)_7$.

Twenty-one (that is, 3 times $7^1$) is then subtracted from 23 leaving a difference of 2. The "unit" pointer 90 of the "unit" indicator 25 is set on "2." Since there is no further remainder, the answer, that is the second numeral to the base 7, is read on the indicators 25, 26, 27, 28 and 29 as "1132." Therefore, $(415)_{10} = (1132)_7$.

It is evident that various other numerals to the base 10 can be converted to their corresponding numeral to any base from 1 through 12, in the illustrated embodiment, in a similar manner. Of course, the range of base numbers can be expanded. Conversely the device can be employed for converting in a reverse direction from a numeral to a base other than 10 to a numeral to the base 10; thus, using the figures of the foregoing example, the operation of the device could have been described in converting 1132 of the base 7 to 415 to the base 10 where 415 was the unknown.

Assuming that the numeral 415 of the base 10 is to be converted to a second numeral to the base 2 as in the binary system, the apparatus of the present invention would necessarily have to be increased in size to accommodate additional base dials 50 and digit dials 75. The number $(415)_{10}$ when converted to a binary number would be equivalent to:

$$1(2^8)+1(2^7)+0(2^6)+0(2^5)+1(2^4)$$
$$+1(2^3)+1(2^2)+1(2^1)+1(2^0)$$

Stated differently, $(415)_{10}$ converted to a binary number would read $(110011111)_2$. Obviously, the apparatus illustrated has only five indicators, 25, 26, 27, 28 and 29 and cannot be used to indicate this binary number.

The largest number to the base 10 which the apparatus illustrated can accommodate to convert to a binary number is 31. In converting $(31)_{10}$ to a binary number with the apparatus disclosed, the ten thousand digital indicator 29, which is the fifth digital indicator reading from right to left in FIG. 1, would be used to indicate the first digit of $(x)_2$. This first digit is determined by first rotating the base dial until the base $2^4$ appears in the indicator window. It is known that $2^4$ is 16. Accordingly, the digit 1, which is exposed by rotation of the segmental plate 80, is used as a reference mark for the pointer 90. Proceeding to the fourth digital indicator 28, each digit in the row 76 has a value of either zero or $1(2^3)$. Since $2^3$ has a value of 8 to the base 10, the pointer 90 of the indicator dial 28 is set at 1. In like manner, the pointers of the indicators 27, 26 and 25 are also set at 1. Thus, the apparatus indicates that $(31)_{10}$ is converted to a binary number consisting of $(11111)_2$. Stated differently, the binary representation of $(31)_{10}$ is $$1(2^4)+1(2^3)+1(2^2)+1(2^1)+1(2^0)$$
$$=16+8+4+2+1=(11111)_2$$

When the base is increased to 12, the apparatus disclosed can readily handle a number of greater magnitude, as for example $(30,816)_{10}$. To convert this to a base of 12, each of the base dials is rotated by means of the linkage indicated at 65 to position the base 12 in the respective indicator windows of the dials. The digit pointers are then respectively positioned at number 1 for the dial 29, number 5 for the dial 28, letter "T," indicating ten, for the dial 27 and zero respectively for both of the dials 26 and 25. Consequently, $(30,816)_{10} = (15T00)_{12}$.

From the foregoing, it is evident that a device has been provided for readily and simply converting a numeral in one base system to its corresponding numeral in a different base system. While specific ranges of base numbers and powers are illustrated, it is to be understood that these ranges are not to be limited to those specifically disclosed. The device is compact, accurate, and is particularly useful as a teaching aid in demonstrating how to make the described conversions.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a device for converting a first number having a first base to an equivalent second number having a second base different from the first base wherein the second number includes first and second digit positions; a support providing adjacent first digit and second digit indicating positions related to corresponding positions of the first and second digits in such a second number, digit dials on the support at each of said positions, each of the digit dials providing a plurality of digits thereon, means mounted on the support for indicating selected digits on each of the dials, a plurality of base dials, each being associated respectively with one of said digit dials, and each of said base dials being provided with a plurality of base indicia thereon, the base indicia of each base dial being raised to a uniform exponential power, and means mounting the base dials on the support at said first and second digit positions for individually exposing selected base indicia and their associated powers.

2. In a device for converting a first number having a first base to an equivalent number having a second base, which device has a plurality of indicators individually adapted to indicate a selected second base and a digit in such a second numeral when such a first numeral and first base are known; means interconnecting the indicators in successively adjacent, predetermined positions, each of indicators including movable means for selectively indicating such a second base raised to a power of the base, the powers on each base indicating means being uniform, the power on one base indicating means being zero and the powers on successively adjacent base indicating means being progressively increased by one, each of the indicators also including movable means for selectively indicating a digit of such a second numeral from zero upwardly to a number one less than the base selectively indicated by said base indicating means; and means interconnecting the base indicating means of all of the indicators for unitary movement of the indicating means and for simultaneously indicating the same base on all of the indicators.

3. The device of claim 2 wherein each indicator includes a row of digits from zero successively upwardly to a predetermined maximum and a cover movable over the row for selectively concealing digits in its respective row, and including means interconnecting the base indicating means and the cover of each indicator for unitary movement whereby the cover conceals selected digits in its respective row, said selected digits including a digit corresponding to the base indicated by its respective indicating means and all of the digits thereabove in its respective row.

4. The device of claim 2 wherein said indicators are located in positions corresponding to the second, third, fourth and fifth digit positions of said second numeral, wherein there is also a digit indicator connected adjacent to the indicator in said second position, and digit indicator including a digit indicating movable means for selectively indicating a digit from zero upwardly to a number one less than the base selected.

5. The device of claim 4 wherein each digit indicating means includes a dial bearing digits from zero upwardly to a digit one less than the highest base capable of being indicated by said base indicating means, and a segmental cover plate movable over the digits and adapted to conceal sequential groups of digits, and means interconnecting the base indicating means and their associated plates for automatically positioning the plates over the digits equal to and greater than the base indicated.

6. A numeral base conversion device comprising a rectangular panel having upper and lower edges, opposite predetermined left and right side edges, front and rear surfaces, and a plurality of windows adjacent to the upper edge and extended between the side edges in equidistantly spaced relation to each other; a plurality of spaced, parallel mounting pins journaled in the panel equidistantly below the windows, the pins being located in a common plane normal to the panel and parallel to the upper and lower edges, there being a pin associated with each window but with the total number of pins exceeding the total number of windows by one pin, said one pin being located adjacent to said right edge; a plurality of front dials on the front surface of the panel, individually associated with the pins, and having arcuate rows of indicia representing digits from zero to eleven, said rows being in substantially concentric relation to their respective pins; pointers individually journaled on the pins in radial extension therefrom for movement relative to the panel into indicating positions pointing toward selected numbers in said rows of numbers; fractionally circular cover plates individually journaled on the pins in opposed relation to the front surface of the panel having arcuate edges substantially concentric to their respective pins and being radially spaced from their respective pins substantially the same distance as said rows of digits, and obtusely angularly related, generally radially extended edges interconnecting their respective arcuate edges, whereby the plates are adapted to cover selected successions of digits in their respective rows of digits incident to rotation of the plates; a plurality of rear dials individually journaled on all of the pins except said one pin, said rear dials being in opposed relation to the rear surface of the panel having arcuate rows of base numbers from one to twelve thereon substantially concentric to the pins and radially spaced from the pins substantially the same distance as said windows whereby said base numbers are individually exposed through the windows incident to rotation of the rear dials, the rear dials also having exponential powers thereon adjacent to each of the base numbers with the powers on each rear dial being the same but differing from the powers on each other rear dial, said powers unitarily progressively increasing upwardly from unity on the rear dial adjacent to said one pin to a predetermined multiple of unity on the rear dial adjacent to the left edge of the panel, said multiple being one less than the total number of pins; and an elongated rigid linkage pivotally interconnecting the rear dials for unitary rotary movement so that corresponding base numbers are simultaneously exposed through said windows in any selected position of the rear dials.

7. The device of claim 6 wherein bushings are journaled on the pins and are rotatable relative to the panel, the rear dials and cover plates being secured to the bushings on their respective pins for unitary movement of said rear dials and plates, and the plates being secured to said bushings so that the plates cover all of the digits on the front dials which are equal to and greater than the bases exposed through said windows in any selected position of the rear dials.

8. A numeral base conversion apparatus comprising a support; a plurality of digit dials carried on the support, each of said dials providing a plurality of digits thereon, said digits extending sequentially from zero through any number "$n$"; means mounted on the support for selectively indicating any of said digits on each of the individual dials; a plurality of base dials, one being associated respectively with each of said digit dials and being respectively provided with a plurality of numerical bases, the bases of each of the dials being provided with respective exponents of the same power, said bases extending sequentially in numerical range from 1 to a number of $n+1$; and means mounting the base dials on the support for individually exposing selected bases and their associated exponent.

9. The device of claim 8 including means mounted on the support for selectively concealing all of the digits on the digit dial equal to and greater than the base exposed on said base dial.

10. The device of claim 9 wherein the concealing means and the base dial are interconnected for unitary movement whereby all of said digits equal to or greater than the exposed base are automatically concealed for each base exposed.

References Cited in the file of this patent
UNITED STATES PATENTS 1,912,406    Rudolph _____ June 6, 1933

FOREIGN PATENTS 394,041    Great Britain _____ June 22, 1933